United States Patent [19]

Hendry

[11] Patent Number: 4,943,407

[45] Date of Patent: Jul. 24, 1990

[54] METHOD OF AND APPARATUS FOR INJECTION MOLDING WITH PRESSURIZED FLUID ASSIST

[75] Inventor: James W. Hendry, Brooksville, Fla.

[73] Assignee: Michael Ladney, Sterling Heights, Mich.

[21] Appl. No.: 235,435

[22] Filed: Aug. 25, 1988

Related U.S. Application Data

[63] Continuation-in-part of Ser. No. 98,862, Sep. 21, 1987, Pat. No. 4,855,094.

[51] Int. Cl.$^5$ .................... B29C 45/00; B29C 45/34; B29D 22/00
[52] U.S. Cl. ................... 264/572; 264/297.8; 264/328.8; 264/328.13; 425/546; 425/560; 425/562; 425/568; 425/572; 425/588; 425/812
[58] Field of Search ............... 264/40.1, 40.3, 85, 264/101, 102, 297.1, 297.2, 297.8, 328.8, 328.13, 572; 425/135, 546, 557, 560, 562, 567, 568, 572, 588, 812

[56] References Cited

U.S. PATENT DOCUMENTS

| | | |
|---|---|---|
| 2,331,688 | 10/1943 | Hobson . |
| 2,345,144 | 3/1944 | Opavsky . |
| 2,714,747 | 8/1955 | Lindemann et al. . |
| 2,714,748 | 8/1955 | Stirnemann et al. . |
| 3,021,559 | 7/1962 | Strong . |
| 3,135,640 | 6/1964 | Kepka et al. . |
| 3,687,582 | 8/1972 | Hendry et al. . |
| 3,966,372 | 6/1976 | Yasuike et al. . |
| 4,033,710 | 7/1977 | Hanning . |
| 4,078,875 | 3/1978 | Eckardt . |
| 4,082,226 | 4/1978 | Appleman et al. . |
| 4,092,389 | 5/1978 | Sakurai . |
| 4,101,617 | 7/1978 | Friederich . |
| 4,106,887 | 8/1978 | Yasuike et al. . |
| 4,129,636 | 12/1978 | Yasuike et al. . |
| 4,136,320 | 1/1979 | Olabisi . |
| 4,140,672 | 2/1979 | Kataoka . |
| 4,234,642 | 11/1980 | Olabisi . |
| 4,247,616 | 1/1981 | Olabisi . |
| 4,333,608 | 6/1982 | Hendry . |
| 4,367,296 | 11/1982 | Hafele . |
| 4,474,717 | 10/1984 | Hendry . |
| 4,555,225 | 11/1985 | Hendry . |
| 4,601,870 | 7/1986 | Sasaki . |
| 4,604,044 | 8/1986 | Hafele . |
| 4,740,150 | 4/1988 | Sayer . |

FOREIGN PATENT DOCUMENTS

| | | |
|---|---|---|
| 2106546 | 8/1972 | Fed. Rep. of Germany . |
| 50-71756 | 6/1975 | Japan . |
| 55-95547 | 7/1980 | Japan ................................. 425/562 |
| 1460101 | 12/1976 | United Kingdom . |
| 1487187 | 9/1977 | United Kingdom . |
| 2139548 | 11/1984 | United Kingdom . |

Primary Examiner—Jeffery Thurlow
Assistant Examiner—Leo B. Tentoni
Attorney, Agent, or Firm—Brooks & Kushman

[57] ABSTRACT

A method, system and device utilized therein for the injection molding of plastic articles of enhanced surface quality using pressurized fluid. The fluid is prevented from contaminating the molten resin in the nozzle from which it was injected to thereby eliminate splay. The method involves the initial step of injecting molten resin at a nominal injection pressure from the nozzle of an injection molding machine through a resin injection aperture at an upstream position in a mold. The resin travels along a resin flow path in the mold to a mold cavity defining the shape of the molded article at a downstream position. The device at least partially defines the resin flow path in the mold. A charge of fluid pressurized at a predetermined level is communicated to the resin flow path through an orifice in the device which opens to the resin flow path. During or after resin injection the pressurized charge of fluid enters the flow path at the orifice and passes into the mold cavity to distribute the molten plastic within the mold cavity. The fluid is contained within the mold cavity under pressure until the article has set up, and is thereafter vented to the atmosphere. The device prevents the pressurized fluid from traveling back along the resin flow path and through the injection aperture. The device thereby prevents contamination of the molten resin in the nozzle.

55 Claims, 9 Drawing Sheets

```
┌─────────────────────────────────────────┐
│   PRESSURIZING A CHARGE OF FLUID AT A   │
│ PREDETERMINED PRESSURE LEVEL LESS THAN A│
│    NOMINAL PLASTIC INJECTION PRESSURE   │
└─────────────────────────────────────────┘
                    │
┌─────────────────────────────────────────┐
│   INJECTING A QUANTITY OF MOLTEN PLASTIC│
│   THROUGH AN INJECTION FLOW PATH INTO A │
│   MOLD CAVITY AT THE NOMINAL INJECTION  │
│                 PRESSURE                │
└─────────────────────────────────────────┘
                    │
┌─────────────────────────────────────────┐
│   COMMUNICATING THE CHARGE OF PRESSURIZED│
│   FLUID DURING THE PLASTIC INJECTION TO │
│    THE FLOW PATH THROUGH AN ORIFICE OF  │
│   SUFFICIENT DIAMETER TO PREVENT FLUENT │
│        ENTRY OF THE MOLTEN PLASTIC      │
└─────────────────────────────────────────┘
                    │
┌─────────────────────────────────────────┐
│   INTRODUCING THE FLUID CHARGE INTO THE │
│  FLOW PATH UPON SUBSTANTIAL COMPLETION OF│
│   THE PLASTIC INJECTION IN RESPONSE TO A│
│    REDUCTION OF THE PRESSURE IN THE FLOW│
│     PATH BELOW THE PREDETERMINED LEVEL  │
└─────────────────────────────────────────┘
                    │
┌─────────────────────────────────────────┐
│    CONTAINING THE FLUID UNDER PRESSURE  │
│   WITHIN THE ARTICLE UNTIL IT HAS SET UP│
│            IN THE MOLD CAVITY           │
└─────────────────────────────────────────┘
                    │
┌─────────────────────────────────────────┐
│         VENTING THE FLUID TO AMBIENT    │
└─────────────────────────────────────────┘
```

*Fig. 1*

METHOD OF AND APPARATUS FOR INJECTION MOLDING WITH PRESSURIZED FLUID ASSIST

CROSS-REFERENCE TO RELATED APPLICATIONS

This application is a continuation-in-part application of U.S. Ser. No. 098,862 filed Sept. 21, 1987 now U.S. Pat. No. 4,855,094 and entitled "METHOD AND APPARATUS FOR THE INJECTION MOLDING OF PLASTIC PARTS",

TECHNICAL FIELD

This invention relates to the use of fluid pressure in a method, system and device utilized therein for injection molding and plastic article.

BACKGROUND ART

It is known in the plastic molding art to use pressurized fluid in conjunction with the plastic molding of articles. The pressurized fluid is typically nitrogen gas which is introduced into the mold cavity with the molten plastic.

The pressurized fluid serves at least two purposes. First, it allows the article so formed to have hollow interior portions which correspond to weight and material savings. Second, the pressurized fluid within the mold cavity applies outward pressure to force the plastic against the mold surfaces while the article sets. This is desirable toward enhancing surface quality by minimizing sink marks in areas of the article having relatively thicker plastic sections, such as structural ribs.

However, the added equipment and process control parameters required to implement fluid injection contribute significantly to the cost and complexity of this type of injection molding.

Another concern is that when the gas and plastic are injected into the mold from the same nozzle, the gas gets trapped in the nozzle area thereby foaming any molten resin in that area during venting. This foamed plastic causes blemishes (i.e. splay) in the next part when injected into the mold.

Of particular concern are the fluid charging components and circuits needed to charge, inject and vent the pressurized fluid at the controlled times and pressures necessary for quality part production on a repeatable, volume basis. Prior art devices addressing this concern have answered with complex valves and seals which are expensive, difficult to operate, and require maintenance or replacement at frequent intervals. The problem is especially acute with seals whose performance diminishes over their useful life.

DISCLOSURE OF THE INVENTION

In accordance with the present invention, a method, system and device utilizes therein are provided for the injection molding of plastic articles using a pressurized fluid, normally nitrogen gas, wherein the gas is prevented from contaminating the molten resin in the nozzle utilized therein.

In carrying out the above, a method for the injection molding of a plastic article in an injection molding system is provided. The system includes a resin injection nozzle and a mold having injection aperture for receiving molten resin from the nozzle at an upstream position and a mold cavity at a downstream position. A resin flow path fluidly communicates the injection aperture and the mold cavity between the upstream and downstream positions. The method includes the step of pressurizing a charge of fluid at a predetermined pressure level, injecting a quantity of molten plastic from the injection nozzle through the injection aperture and the flow path and into the mold cavity at a nominal plastic injection pressure and communicating the charge of pressurized fluid to an orifice opening to the resin flow path in the mold between the upstream position and the downstream position. The method further includes the step of introducing the fluid charge into the flow path from the orifice simultaneously with or after the step of injecting to distribute the molten plastic within the mold cavity. The method further includes the step of preventing the introduced fluid charge from traveling from the flow path through the injection aperture and into the injection nozzle. The fluid is contained under pressure within the article until it has set up in the mold cavity. The fluid is then vented to ambient.

Also in carrying out the present invention, an injection molding system for the injection molding of plastic articles is provided. The system includes an injection molding machine having an injection nozzle for injecting molten plastic through the nozzle and a mold having an injection aperture at an upstream position, a cavity defining the shape of the molded article at a downstream position, and a resin flow path for fluidly communicating the injection aperture in the cavity between the upstream and downstream positions. The system further includes fluid charge means for pressurizing a charge of fluid at a predetermined level and fluid circuit means interconnecting and communicating the flow path and the fluid charge means between the upstream and downstream positions at an orifice opening to the flow path. The fluid circuit means introduces the charge of fluid to the flow path simultaneously with or after plastic injection. The fluid charge distributes the molten plastic in the mold cavity. A mechanism or device of the fluid circuit means prevents the fluid charge from traveling from the flow path, through the injection aperture and into the nozzle.

Still further in carrying out the invention, in an injection molding system of the type including an injection nozzle and a mold having a mold cavity at a downstream position and a resin injection aperture at an upstream position and a resin flow path fluidly communicating the injection aperture and the mold cavity, a device is provided for assisting the introduction of pressurized fluid into the cavity and preventing the fluid from traveling from the flow path, through the injection aperture and into the nozzle. The device includes a body adapted to seat in the mold between the upstream and downstream positions. The body defines at least part of the resin flow path communicating the injection aperture with the cavity. The body has an orifice opening to the flow path, an external fluid port and a fluid passage extending between the external fluid port and the orifice.

The location of the fluid entry orifice or point is downstream of the injection nozzle in an area of the mold where the mold is relatively cool. In conventional prior art designs the fluid entry point is through the injection nozzle in an area where the plastic is relatively hot and is at its molding temperature.

BRIEF DESCRIPTION OF THE DRAWINGS

FIG. 1 is a flow chart setting forth the operational steps of one embodiment of the method of the present invention;

BEST MODE FOR CARRYING OUT THE INVENTION

Figure 2:
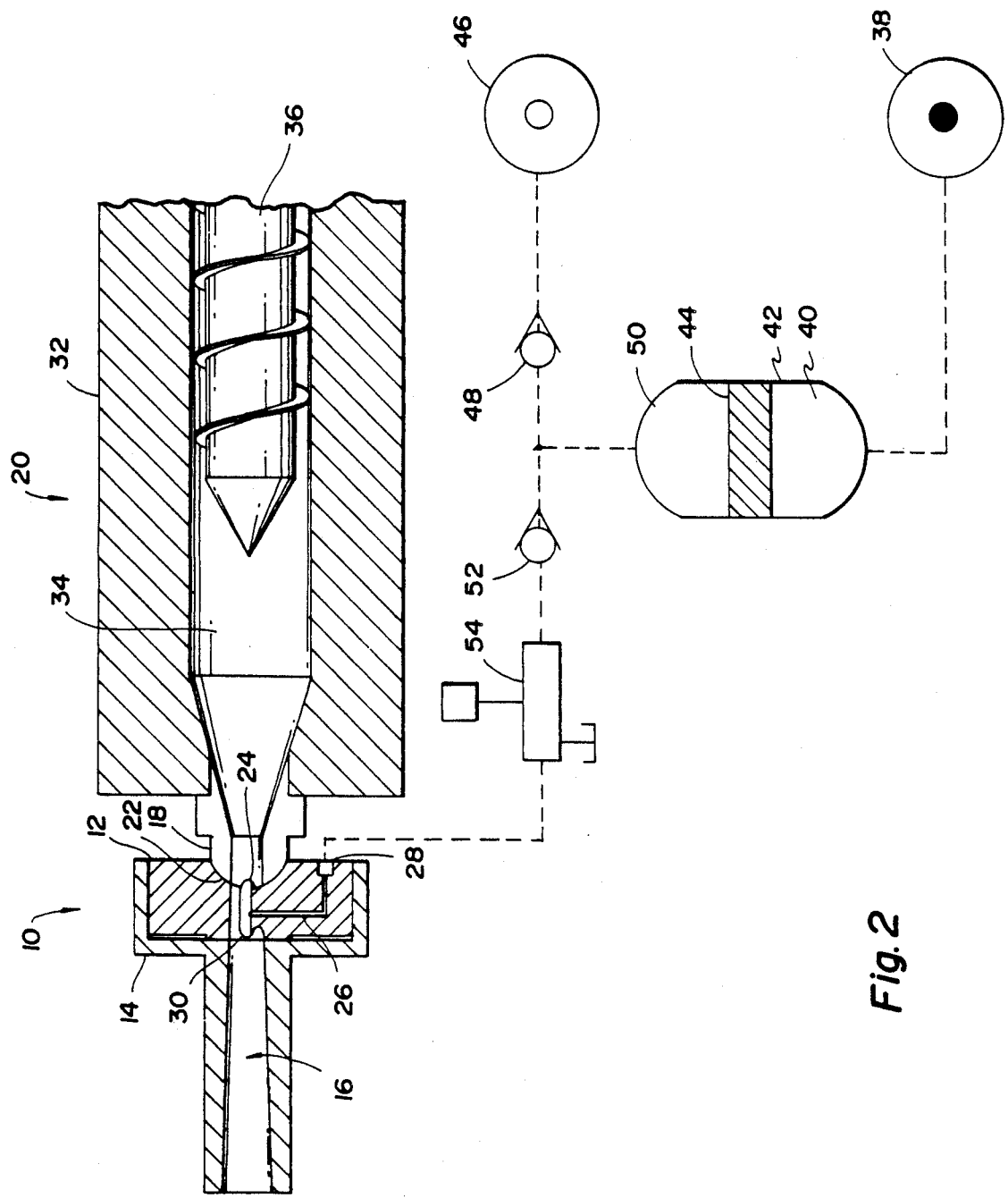
FIG. 2 is a general schematic view of a system constructed in accordance with the present invention.

The present invention will be first described by reference to the operational steps of a first embodiment of the method. Second, the apparatus employed in the first embodiment will be described. The operation of the apparatus in accordance with the method will be described in connection with an injection molding cycle. Finally, alternative embodiments of the apparatus will be described.

General Method of Operation

FIG. 1 is a flow chart setting forth the general operational steps involved in one embodiment of the method of the present invention. In overview, the method provides for molding of plastic articles with hollow interior sections where pressurized fluid is present in the formation of the article in the mold cavity. The presence of the pressurized fluid creates an outward pressure which minimizes sink marks and reduces the material requirements and weight of the molded article.

In step 1, a charge of fluid is pressurized at a predetermined level which may be higher or lower than the nominal plastic injection pressure. If the charge of fluid is introduced during resin injection, the charge of fluid may be at a lower pressure than the pressure of the plastic injection pressure. If the charge of fluid is introduced after resin injection, the charge of fluid may be either higher or lower than the plastic injection pressure.

In step 2, the quantity of molten plastic is injected from the nozzle of a conventional injection molding machine through a flow path into a mold cavity at the nominal injection pressure. The quantity of molten plastic, i.e. the plastic shot, is less than the quantity of plastic which would be ordinarily required to fill the mold cavity.

In step 3, the charge of pressurized fluid, preferably nitrogen gas, is communicated from a chamber where it is introduced into the flow path through an orifice which, in the first embodiment, is of sufficiently small dimension to resist entry of the relatively viscous molten plastic. The relatively greater pressure associated with injection of the molten plastic prevents entry of the fluid charge into the plastic flow until substantial completion of the injection stroke of the molding machine.

In step 4, the charge of pressurized fluid in the first embodiment responds to a reduction of the pressure in the flow path associated with substantial completion of the plastic injection. This causes the fluid charge to enter the flow path and to continue into the mold cavity. The entry of the fluid charge into the cavity is self-executing in response to the pressure drop at the end of the plastic injection stroke, and no timers, valves or the like are specifically required to introduce the fluid charge into the plastic melt in the mold cavity.

In step 5, the pressurized fluid is contained within the molding while the plastic solidifies and defines the shape of the molded article. During this time pressurized fluid exerts outward pressure which forces the plastic to conform to the detail of the mold surface and exhibit fine detail with minimal sink marks or other surface defects.

In step 6, the fluid is vented to ambient from the mold cavity prior to opening the mold and removing the finished molded article

DESCRIPTION OF THE APPARATUS

FIG. 2 is a general schematic view of the embodiment of a system suited for practicing the plastic injection molding method of the present invention.

The controlled entry of pressurized fluid, typically nitrogen gas, is accomplished by use of a modified mold sprue 10. The sprue 10 includes a disk-shaped insert 12 disposed within a sprue body 14.

The mold sprue 10 cooperates with a conventional plastic injection molding machine 20. The nozzle 18 of the molding machine 20 mates with a concave surface 22 on the face of the insert 12 to provide a continuous path 16 for the flow of plastic from the machine through the sprue 10 and into a mold cavity (not shown).

The flow of molten plastic through the insert 12 may be diverted by a conventional torpedo 24 of the type well known in the art.

The introduction of pressurized fluid to the flow path is through passage segments 26 and 28 formed (by drilling or the like) in the insert. The passage 26 opens into the flow path through an orifice 30 of sufficiently small dimension, e.g. 0.005–0.040 in., depending on the viscosity of the plastic, to effectively prevent entry of the relatively high viscous molten plastic during injection.

The plastic injection molding machine 20 includes a barrel 32 with a central cylindrical opening 34. A screw 36 serves to plasticize and advance resin toward the nozzle area. Upon complete plasticization of the resin the screw 36 is hydraulically advanced toward the head of the barrel 32 to inject molten plastic through the nozzle 18. The plastic passes through the sprue insert 12 at a nominal plastic injection pressure through the stroke of the screw 36. This pressure falls upon substantial completion of the stroke and discharge of the plastic from the barrel 32 of the molding machine 20.

Figure 3:
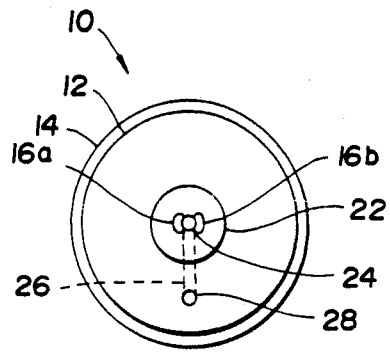
FIG. 3 is an end view of a sprue bushing employed in the apparatus of FIG. 2.
Figure 4:
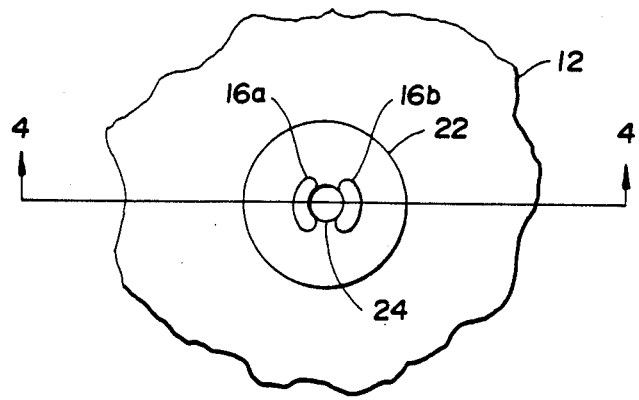
FIG. 4 is a fragmentary enlarged view of the central portion of the sprue bushing of FIG. 3.
Figure 5:
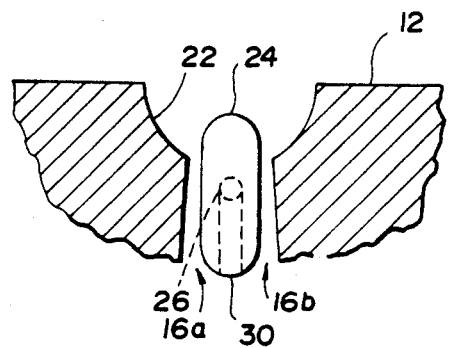
FIG. 5 is a sectional view of the central portion of the sprue bushing taken along line 4-4 of FIG. 4.

The sprue bushing or insert 12 is illustrated in greater detail in FIGS. 3, 4 and 5.

The insert 12 is shown mounted concentrically in a recess in the sprue body 14. Molten plastic passes from the nozzle and around the torpedo through a pair of kidney-shaped apertures 16a and b which serve as first and second branches in the flow path. The pressurized fluid is communicated to the plastic path flow through passage segment 26 and orifice 30 which is mediate the plastic flow branches and co-linear therewith.

The temperature of the insert 12 can be controlled depending on the processing specifications of the plastic being used by employing electrical heater bands or other types of auxiliary heat sources as is well known in the art.

Again with reference to FIG. 2, the apparatus also includes a mechanism for charging and communication of pressurized fluid, or gas, to the sprue insert 12.

A hydraulic fluid supply 38 directs a working fluid, such as oil, under pressure to a chamber 40 of an accumulator 42 effectively separated into two chambers, having mutually and inversely variable volumes, by a compression piston 44. A fluid supply 46 is provided for directing a charge of gas through a first check valve 48 into the second chamber 50 of the accumulator 42 for pressurization. A valve 54 controls communication of gas from the chamber 50 to the sprue insert 12. A second check valve 52 is connected in series with the control valve 54.

OPERATION

A typical plastic injection molding cycle is initiated by directing a charge of fluid, normally nitrogen gas, under pressure from the fluid supply 46 into the chamber 50 of the compression cylinder 42, and then directing oil, also under a predetermined pressure from the hydraulic fluid supply 38, into the first chamber 40 of the compression cylinder 42. The compression piston 44 maintains the amount of gas held in the second chamber 50 at a constant pressure as a function of the pressure of the oil in the first chamber 40.

Plastic resin is melted and fed by the rotating screw 36 into the plastic injection apparatus forward chamber of the cylinder 34. When the molten plastic has been accumulated therein, the screw 36 is advanced linearly, forcing the molten plastic through the nozzle 18 and into the flow path 16.

During the plastic injection stroke, the gas charge in the second chamber 50 of the cylinder 42 is communicated through fluid lines and the segments 26 and 28 in the sprue bushing insert 12 to the fluid injection orifice 30 in the downstream end of the torpedo 24. The fluid pressure at the orifice 30 is at a predetermined level which is less than that of the nominal plastic injection pressure, but it is sufficiently high and the dimension of the orifice 30 is sufficiently small to effectively resist the entry of molten plastic thereinto. The level of fluid pressure at the orifice 30 may be determined through a few manual trial cycles and review of the surface quality of the molded articles produced at the trial pressures.

As the plastic injection stroke is substantially completed, the pressure of the plastic will fall below the predetermined pressure of the fluid at the orifice 30. The fluid responds by following the plastic along flow path 16 into the mold cavity.

As the gas is injected, it follows the path of least resistance within the mold cavity. Since the molten plastic cools and hardens from its outer surface inwardly, the gas will penetrate the inner, warmer, softer part of the plastic normally formed with thicker sections, e.g. a structural rib, creating a hollow within the plastic in this area and expanding it outwardly to fill the mold cavity. During the gas injection phase of the molding cycle, the gas pressure can be held at an effectively constant level by maintaining an application of constant oil pressure against the compression piston 44 in the compression cylinder 42; or it can be allowed to decay as the gas expands within the plastic.

In practice it has been found that the injected fluid meets with an initial resistance upon reaching the plastic in the mold cavity, and once it penetrates the plastic the resistance steps down substantially. Hence, an initially higher breakthrough pressure should be maintained for the fluid, and thereafter the fluid pressure can be decreased, in a step function or otherwise, to avoid unnecessarily high fluid pressure within the plastic article while it is setting up in the mold cavity. A controlled reduction in pressure will tend to minimize the chance of straining the part before the plastic has cooled and hardened. If the part is strained, the part will distort outside the mold.

After the plastic has completely filled the mold cavity and the gas flow through the fluid injection orifice 30 has terminated, the oil that had been introduced under pressure to the chamber 40 of the accumulator 42 is evacuated. Subsequently, when the plastic article has cooled sufficiently to be structurally self-supporting, the gas within it is vented to atmosphere under control of the valve 54 through the same passages 26 and 28 by which it entered the insert 12. Ventilation may be accomplished solely via the fluid passage 26 or in combination with movement of the nozzle 18 away from the mold (i.e. sprue break).

It is preferred to meter or regulate the ventilation of gas to ambient to minimize the risk of drawing any fluent plastic or impurities with the fluid and thereby contaminating or clogging the fluid path. The mold can then be opened and the molded article ejected.

Figure 6:
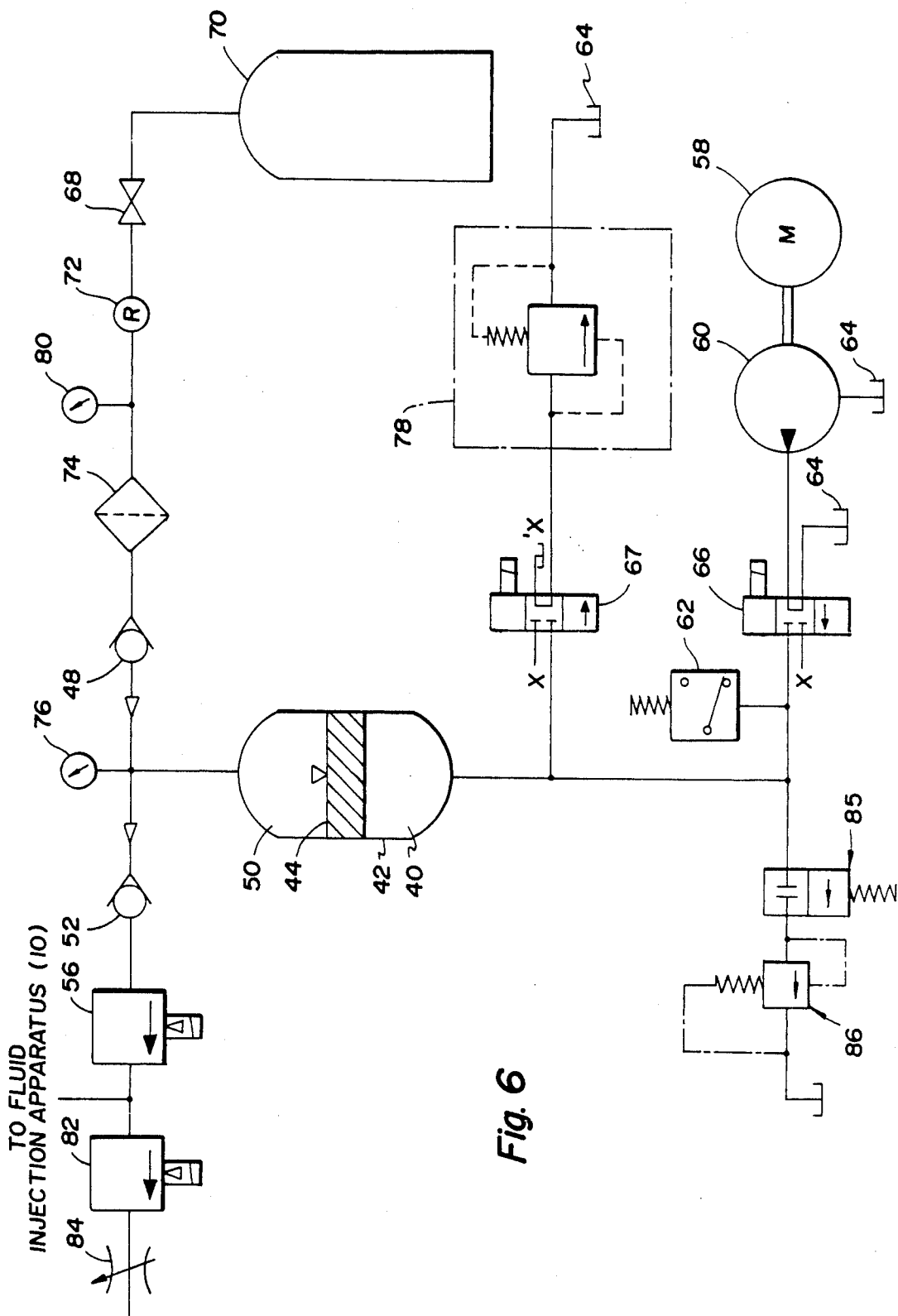
FIG. 6 is a detailed schematic view of the pressurized fluid circuit shown schematically in FIG. 2.

With reference to FIG. 6, the mechanism for charging and pressurizing fluid or gas, for use in the subject molding process, will be described in greater detail.

Initially, power is applied to an electric motor 58, which drives a hydraulic pump 60, forcing hydraulic fluid, or oil, at a pressure controlled by a pressure switch 62, from a reservoir 64 through a directional control valve 66 in its neutral position and back to the reservoir. A shut-off valve 68 is next opened, allowing pressurized fluid, or gas, to flow from a fluid supply, or tank 70, through a pressure regulator 72, an inline filter 74 and a check valve 48 and into the chamber 50 of the accumulator 42. This charge of gas is retained in the chamber 50 by the check valve 48 and a directional control valve 56.

The directional control valve 66 is energized, and oil is directed to the chamber 40 of the accumulator 42, forcing the compression piston 44 upward and applying pressure thereby to the gas residing in the chamber 50 of the compression cylinder. When the pressure of the oil has reached a preset level controlled by a selected setting on the pressure switch 62 and indicated by a gas pressure gauge 76, the directional control valve 66 is de-energized, isolating the oil in the chamber 40 at this pressure. The directional control valve 56 is then opened long enough to communicate the gas in the chamber 50 of the accumulator 42 through the passages 26 and 28 in the insert 12 shown in FIG. 2 of the injection orifice 30.

Adjustments to the level of the pressure created by the action of the compression piston 44 upon the gas within the second chamber 50 of the compression cylinder 42 can be made at this time by altering the setting of the pressure switch 62 and repeating the previously described preparation cycle until the desired pressure is indicated by the pressure gauge 76.

The directional control valve 67 is energized; and the gas pressure in the chamber 50 forces the compression piston 44 downward, in turn forcing the oil out of the first chamber 40 and through the directional control valve 67 and a counterbalance valve 78 to the reservoir 64. The pressure of the oil being directed to the reservoir 64 is controlled by the counterbalance valve 78, which is set at a pressure slightly below that of the pressure regulator 72. The gas pressure between the latter and the check valve 48 is indicated by a pressure gauge 80.

Following the previously described preparation, a first cycle of operation may be initiated by rotating the screw 36 in the plastic injection molding machine 20 shown in FIG. 2 until a predetermined amount of molten plastic has accumulated in the forward chamber 34 of cylinder 32. Directional control valve 66 shown in FIG. 5 is then energized; and oil is directed to the chamber 40 of the accumulator 42, forcing the compression piston 44 upward and applying pressure thereby to the gas residing in the chamber 50. When the pressure has reached the predetermined level controlled by the pressure switch 62, the directional control valve 66 is de-energized, isolating the oil in the chamber 40 at this pressure and thereby maintaining the charge of gas in the chamber 50 at the same pressure.

The screw 36 in the plastic injection molding machine in FIG. 2 is then advanced linearly, forcing the molten plastic accumulated in the injection cylinder chamber 34 through the nozzle 18 and into the flow path 16 leading to the mold cavity (not shown). As shown in detail in FIGS. 3–5, within the sprue bushing insert 12, the torpedo spreads the plastic into first 16a and second 16b paths, the cross-sectional areas of which increase in the direction of the plastic flow. At a selected point during or after the linear advance of the screw 36, the directional control valve 56 in FIG. 6 is opened, allowing the gas in the chamber 50 to flow through the second check valve 52 and directing it through the passage segments 26 and 28 shown in FIG. 2 to the orifice 30 in the downstream end of the torpedo 24.

After the plastic has filled the mold cavity, the directional control valve 56 is closed, capturing the gas in the mold cavity. The directional control valve 66 is energized, only if the oil and gas pressures were maintained constant during the gas injection phase; and the gas pressure in the chamber 50 forces the compression piston 44 downward, in turn forcing the oil out of the chamber 40 and through directional control valve 67 and the counterbalance valve 78 to the reservoir 64. The pressure of the oil being directed to the reservoir 64 is controlled by the counterbalance valve 78, which is set at a pressure slightly below that of the pressure regulator 72. The gas pressure between the latter and the check 48 is indicated by the pressure gauge 80.

After the compression piston 44 has moved to its fully retracted position, directional control valve 67 is de-energized and the valve 66 is energized. Oil is directed to the first chamber 40 of the accumulator 42, once again forcing the piston 44 upward and compressing the gas present in the second chamber 50. When the oil pressure has reached the predetermined level controlled by the pressure switch 62, the directional control valve 66 is de-energized, isolating the oil in the chamber 40 at this pressure and thereby maintaining the charge of gas in the second chamber 50 at the same pressure, ready for the next plastic injection cycle.

After the plastic article has cooled sufficiently within the mold cavity to be structurally self-supporting, a directional control valve 82 is opened, venting the gas from within the hollow plastic article at a metered rate controlled by a flow control valve 84. Thereafter, the directional control valve 82 is closed and the completed article is ejected from the mold.

In the alternative arrangement, the pressure of the fluid during injection into the mold cavity can be regulated in stages. As previously mentioned, the fluid meets with an initially greater resistance until it has penetrated the plastic. For this purpose the valve 85 may be actuated at a selected point in the fluid injection to reduce the pressure in chamber 40. The actuator of valve 85 can be determined on a pre-set time basis, or in response to a sensed pressure drop below a lower limit in the flow path. The sensed pressure drop would correlate with breakthrough of the fluid into the molten plastic. The valve 85 is cooperative with a counterbalancing valve 86 to permit a controlled flow of oil from chamber 40 to the reservoir 64.

Figure 7:
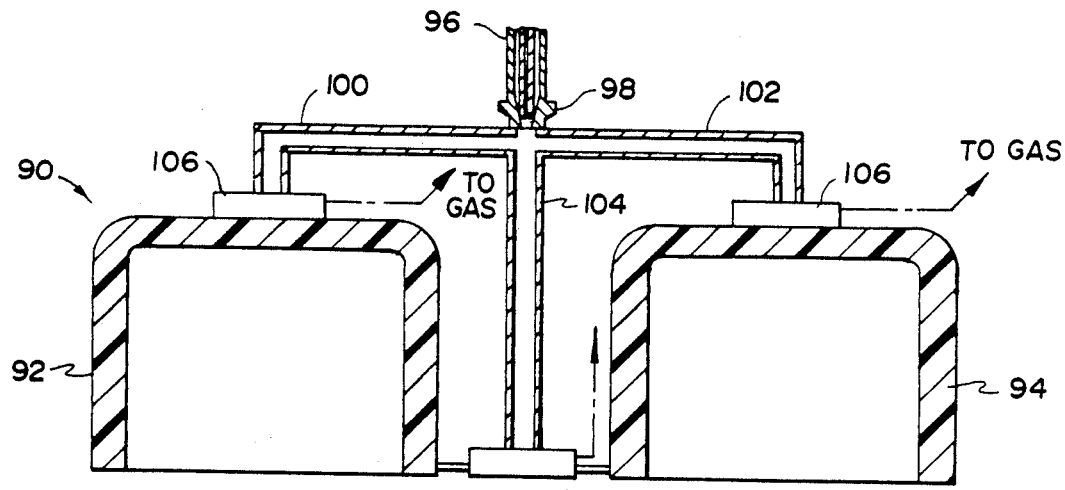
FIG. 7 is a general schematic view of the present invention adapted to a hot runner mold with multiple plastic and fluid entry points in the mold cavity.
Figure 8:
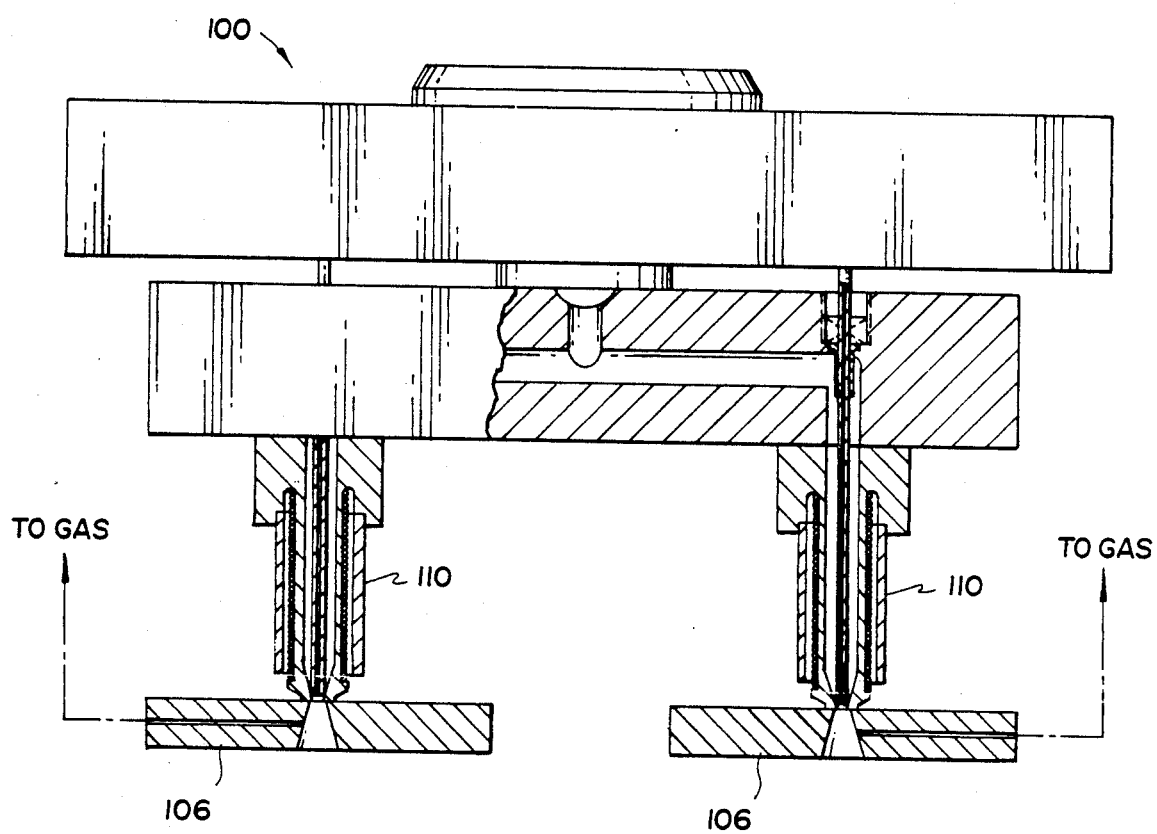
FIG. 8 is a more detailed diagrammatic view of a hot runner system adaptation consistent with the schematic view of FIG. 7.

In reference to FIGS. 7 and 8, the method of the present invention is shown adapted to a hot runner mold system in which a mold cavity has plural plastic entry points.

FIG. 7 is a schematic view of a typical mold 90 in cross section with two part cavities 92 and 94. A nozzle 96 mates with a sprue 98 to introduce molten plastic into a runner system having three branches 100, 102 and 104. At each plastic entry point a disk-shaped device 106, similar to the construction of insert 12 of FIGS. 2-5, functions to permit the selective introduction of pressurized fluid into the cavity.

FIG. 8 is a more detailed diagrammatic view of a conventional hot runner manifold 108. The manifold includes separately adjustable nozzles 110 which supply plastic through the devices 106.

With reference to FIGS. 9 through 22, the method and system of the present invention can also be practiced with apparatus including devices or sprue bushings, generally indicated at 12', 12'', 12''' , or 12''''. The sprue bushings of drawing FIGS. 9 through 22 have parts which are given the same reference numerals as the sprue bushing 12 of FIGS. 1 through 8 to designate parts which are the same or substantially similar in either structure or function to the parts of FIGS. 1 through 8.

For example, the sprue bushing 12' of FIGS. 9 through 12 includes a first body part 13' in which a second body part or cylindrical pin 15' is mounted for rotary movement upon actuation of a rotary actuator, generally indicated at 21'. A shaft 23' of the rotary actuator 21, interconnects the pin 15' to the rotary actuator 21'.

A nozzle 18' having a concave surface 19' mates with the outer cylindrical convex surface 22' of the cylindrical pin 15' at an upstream position after extending through an injection aperture 17' formed in the first body part 13'.

Figure 9:
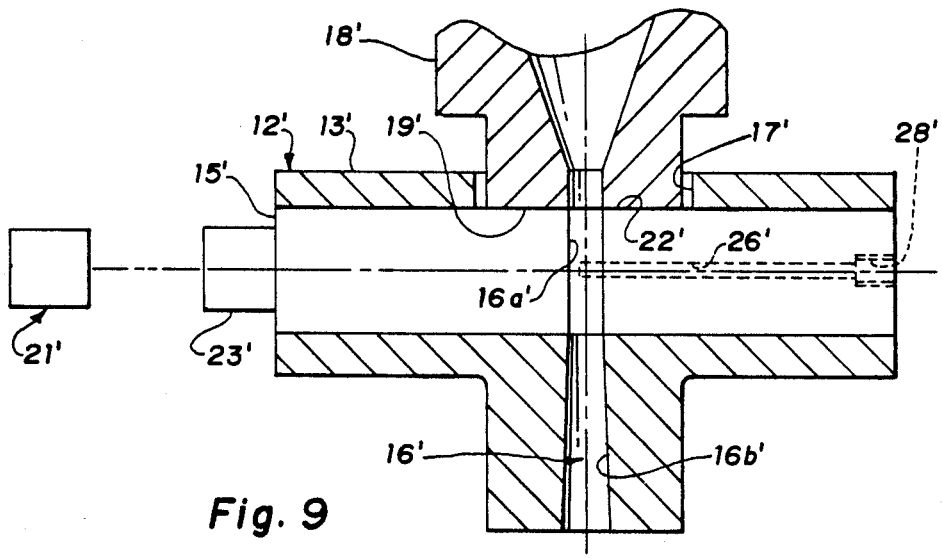
FIG. 9 is a sectional schematic view, partially broken away, illustrating a second embodiment of a sprue bushing of the present invention having a rotary pin in a first control position.

In a first control position of the pin 15' as illustrated in FIG. 9, a tapered plastic flow aperture 16a' formed completely through the pin 16' is aligned with a tapered plastic flow aperture 16b' formed in the first body part 13' to allow the plastic to flow from the nozzle 18' into the mold cavity(not shown) at a downstream position. The apertures 16a' and 16b' form part of the flow path 16' for the plastic.

Figure 10:
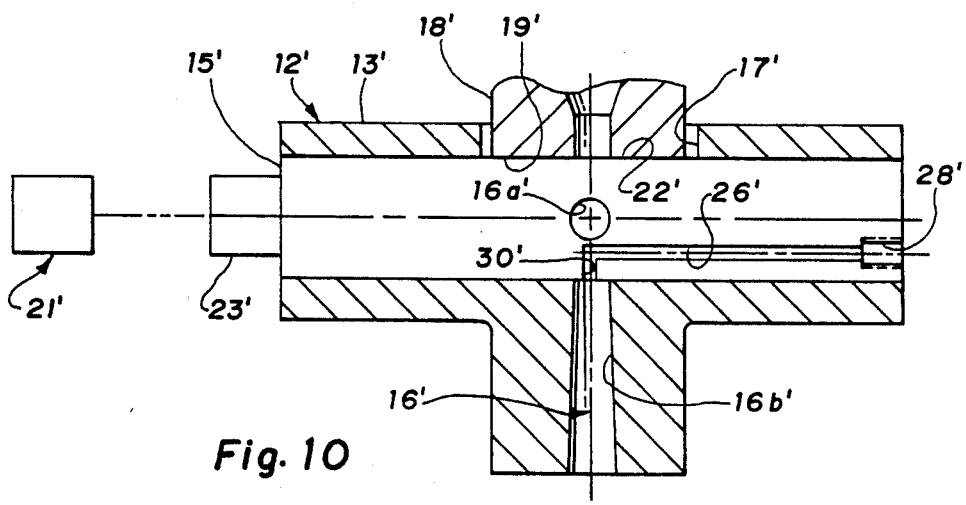
FIG. 10 is a view similar to FIG. 9 with the rotary pin disposed in a second control position 95 degrees from the first control position.
Figure 11:
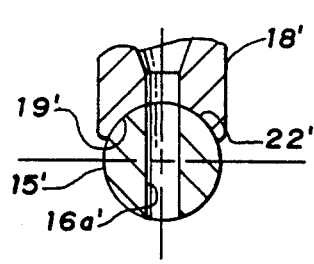
FIG. 11 is an end view, partially broken away and in cross-section illustrating the relative shapes of the pin and the plastic injection nozzle of FIGS. 9 and 10.
Figure 12:
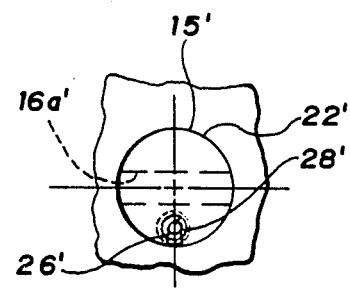
FIG. 12 is an end view of the pin of FIG. 10.

In a second control position of the pin 15' as illustrated in FIG. 10, the pin 15' is rotated to the second control position from the first control position by the rotary actuator 21' approximately 90 degrees so that a fluid passage 26' opens into the flow path 16, through an orifice 30'. The fluid passage 26' extends between an external fluid port 28' in the pin 15' to the orifice 30'.

Preferably, the nozzle 18' provides a relatively high pressure fluid seal against the pin 15 ' during plastic injection and during injection of the compressed nitrogen gas. The nozzle 18' provides a relatively low pressure fluid seal to permit movement of the pin 15' while still preventing molten resin from oozing from either the nozzle or the mold.

The fluid passage 26' also serves as a vent port during ventilation of the mold part. Ventilation may be accomplished solely via the fluid passage or in combination with movement of the nozzle 18' away from the mold (i.e. sprue break).

Also, as in the first embodiment, the sprue bushing 12' may be heated.

The pin 15', in combination with the first body part 13' operates like a shutoff valve which is conventionally incorporated within the nozzle 18'. Such a shutoff valve is typically very expensive.

Figure 13:
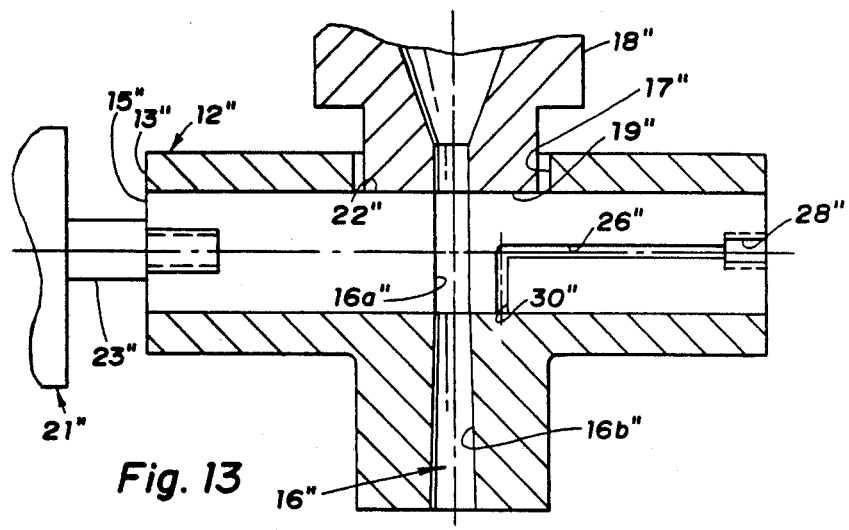
FIG. 13 is a view similar to FIG. 9 but illustrating a third embodiment of a sprue bushing having a pin constructed in accordance with the present invention and in its first control position.
Figure 14:
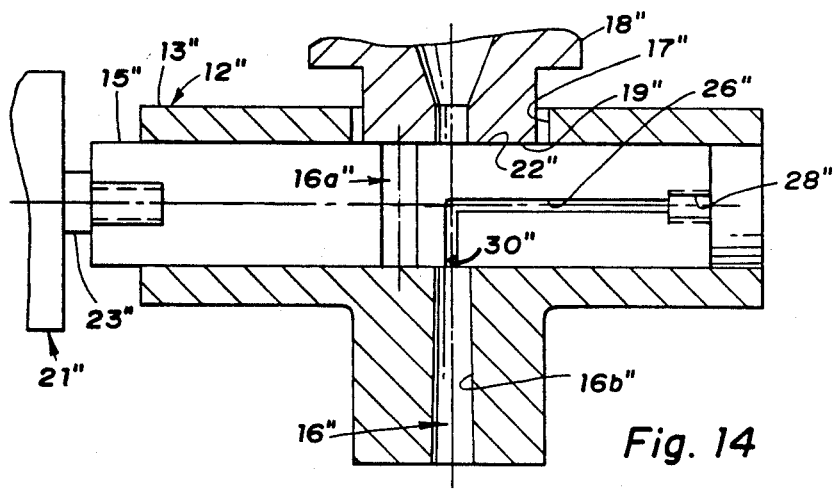
FIG. 14 is a view similar to FIG. 13 with the pin of FIG. 13 translated linearly to the left to a second control position.
Figure 15:
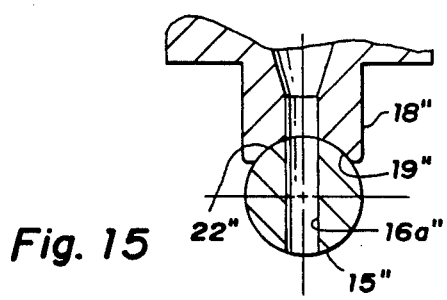
FIG. 15 is an end view, partially broken away and in cross-section, illustrating the relative configurations of the pin of FIGS. 13 and 14 and the injection nozzle.
Figure 16:
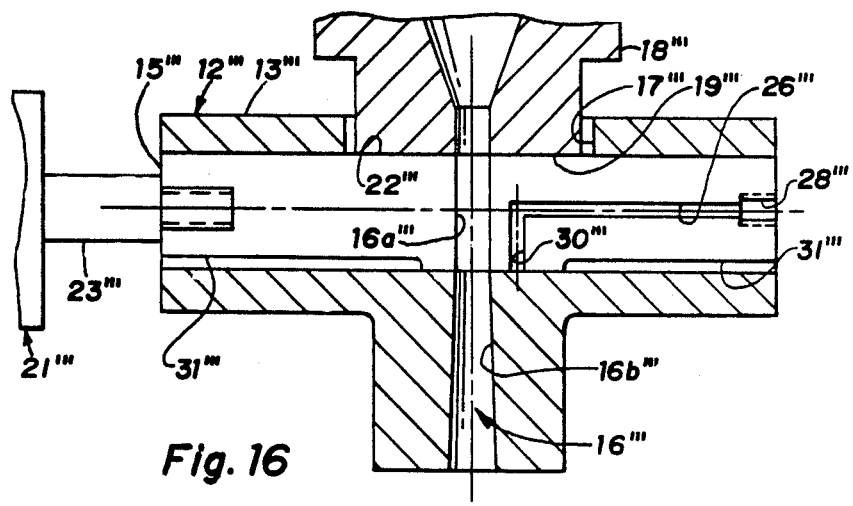
FIG. 16 is a view similar to FIG. 9 but illustrating a fourth embodiment of a sprue bushing constructed in accordance with the present invention and in its first control position.
Figure 17:
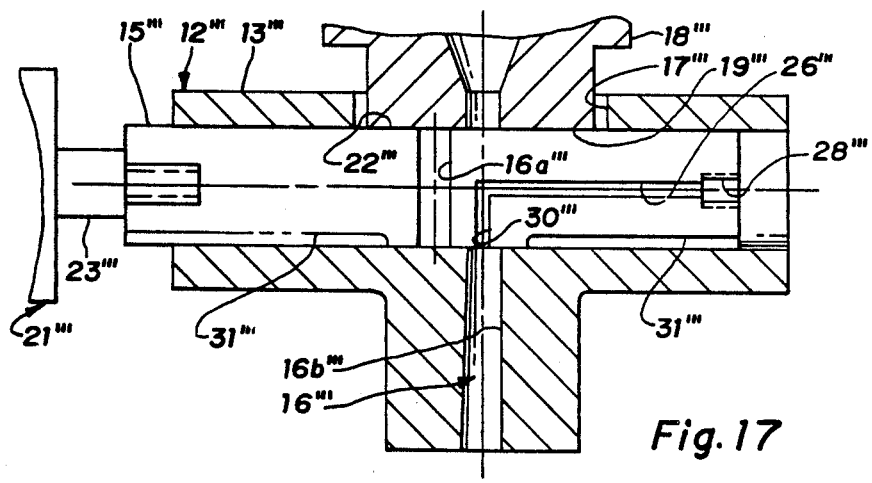
FIG. 17 is a view similar to the view of FIG. 16 with the pin of FIG. 16 translated linearly to a second control position.
Figure 18:
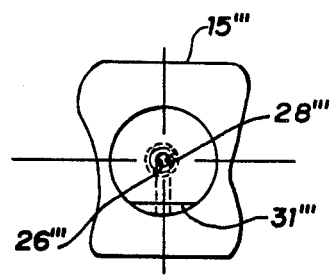
FIG. 18 is an end view, partially broken away, of the pin of FIGS. 16 and 17.

Referring now to FIGS. 13 through 15 there is illustrated a third embodiment of a sprue bushing, generally indicated at 12'' wherein, instead of a rotary actuator 21'', a linear actuator, generally indicated at 21''', is utilized to linearly move the pin 15'' between first and second control positions, as illustrated in FIGS. 13 and 14, respectively. In the first control position, a plastic flow aperture 16a'' is aligned with a plastic flow aperture 16b''. As shown in FIG. 14, a fluid passage 26'' is aligned with the aperture 16b'' to allow the communication of the fluid passage 26'' with the aperture 16b''.

Figure 19:
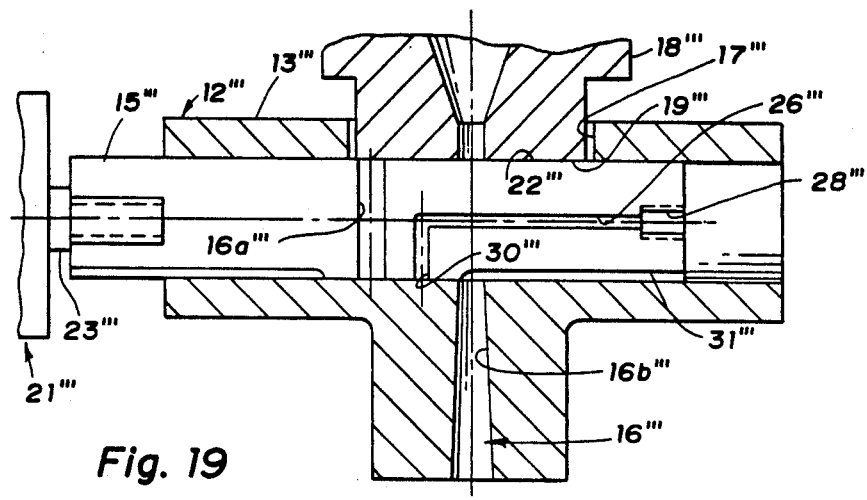
FIG. 19 is a view similar to FIGS. 16 and 17 with the pin located in a third control position after being translated linearly from the second control position of FIG. 17.

Referring now to FIGS. 16 through 19, is illustrated a fourth embodiment of a sprue bushing, generally indicated at 12''', which is similar to the sprue brushing 12'' of FIGS. 13 through 15. The main difference between the third embodiment and the fourth embodiment is that the venting occurs at one of a pair of vent slots 31''', as best shown in FIG. 19, upon linear movement of the pin 15'''' caused by the linear actuator, generally indicated at 21''''. As in the second embodiment, venting may be accomplished solely by the vent slots 31''' or in combination with sprue break.

In each of the second, third and fourth embodiments, after the gas is vented from the molding or molded article, realignment of the aperture 16a with aperture 16b allows the removal of any plastic within the passages 16a and 16b prior to the beginning of another cycle. Alternatively, the plastic goes into the mold cavity in the next cycle. Because of the misalignment between aperture 16a and 16b in these embodiments, there is no chance for the gas to migrate back to their respective resin injection apertures to contaminate the plastic in their respective nozzles.

Figure 20:
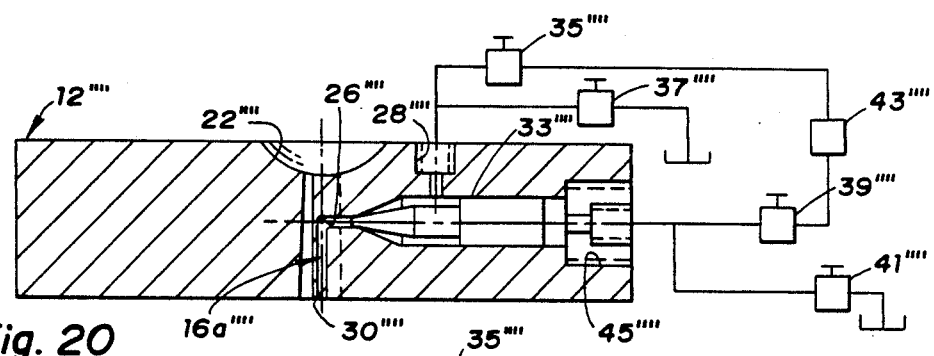
FIG. 20 is a schematic view of a modified version of the sprue bushing of FIGS. 2 through 5 having a valve mechanism disposed therein in a first control position in combination with various external directional valves.
Figure 21:
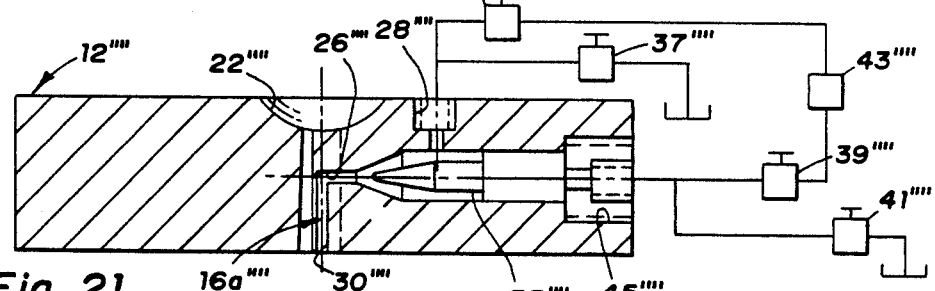
FIG. 21 is a view similar to FIG. 20 with the internal valve mechanism disposed in its second control position to allow gas to enter the flow path of the plastic.
Figure 22:
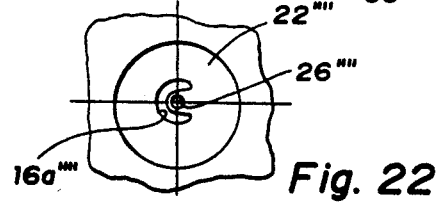
FIG. 22 is an enlarged top plan view, partially broken away, of the sprue bushing of FIGS. 20 and 21 illustrating the plastic flow path through the sprue bushing, the fluid passage extending therethrough and their interrelationship therebetween.

Referring now to FIGS. 20 through 22, there is illustrated yet still another embodiment of a sprue bushing 12''''' constructed in accordance with the present invention. In this embodiment, a sliding needle valve 33''''' is located in the sprue bushing 12'''''. In the closed position of the needle valve 33''''', no plastic can get past the needle valve 33''''' during plastic injection. In the open position of the needle valve 33''''', as illustrated in FIG. 21 gas is injected through a port 28''''' and flows through a fluid passage 26''''', through an orifice 30''''' and into the plastic flow path leading to the mold cavity (not shown). Also, gas is vented from the molding (not shown) in the position illustrated in FIG. 21 back through the port 28'''''.

Movement of the needle valve 33''''' is controlled by directional valves 35''''', 37''''', 39'''''and 41''''' from a nitrogen gas source 43''''' in the following sequence. Initially, the directional valve 39''''' is energized while the remaining directional valves are de-energized to move the needle valve 33''''' to its closed position, as illustrated in FIG. 20. As previously mentioned, in this position the molten plastic is injected through the aperture 16a ''''' in the sprue bushing 12'''''.

When the plastic injection is substantially finished, directional valves 35''''' and 41''''' are energized and the directional valve 39''''' is deenergized to allow the gas pressure at port 28''''' to move the needle valve 33''''' to its rightmost position as illustrated in FIG. 21. Concurrently, the gas in port 45''''' is vented to atmospheric or ambient pressure through the directional valve 41'''''.

In the position as illustrated in FIG. 21, gas can flow through the port 28''''', through the passage 26''''', through the orifice 30''''' and into the plastic flow path.

After the part has set up in the mold, the directional valve 37''''' is energized and the directional valve 35''''' is deenergized to allow the pressure in the molding to be relieved.

Finally, the directional valve 37'''' is deenergized and the directional valve 39'''' is energized to move the needle valve 33'''' to its closed position, as again illustrated in FIG. 20 in anticipation for beginning of another cycle.

As illustrated in FIG. 22, the aperture 16a'''' is illustrated as a crescent within which the fluid passage 26'''' is partially enclosed. In the first and last embodiments, the orifices 30 and 30'''' open into the plastic flow path adjacent the bottom surface of the bushing 12 and 12'''' respectively, colinear with the plastic flow. To prevent migration of the gas towards the nozzle, the apertures 16a, 16a'''' and 16b are tapered. This difference in cross-sectional area of the resin flow path as well as the relative small size of the resin flow path through the sprue bushing prevent this migration so that the gas is not mixed with the plastic within its nozzle, but rather downstream from the sprue bushing 12''''. In each of the embodiments, the resistance of the plastic to gas flow is greater between the orifices 30, 30' 30", 30''' and 30'''' and their respective upstream positions than between the orifices and their respective downstream positions. Consequently, the gas flows from the orifices 30, 30', 30", 30''' and 30''''towards their respective mold cavities at the downstream positions rather than towards their respective upstream positions at the resin injection apertures.

While the best mode for carrying out the invention has been described in detail, those familiar with the art to which this invention relates will recognize various alternative designs and embodiments for practicing the invention as defined by the following claims.

What is claimed is:

1. An apparatus for the injection molding of plastic articles comprising:
    an injection molding machine for injecting molten plastic through a nozzle into a flow path at a nominal injection molding pressure;
    a mold having a cavity defining the shape of the molded article and at least one plastic entry point coupled to the plastic flow path;
    fluid charge means for pressurizing a charge of fluid at a predetermined level no greater than the nominal injection pressure; and
    fluid circuit means, interconnecting the flow path and the fluid charge means, for communicating the charge of fluid to the flow path during plastic injection and responding to a pressure reduction in the flow path below the predetermined level of pressure to introduce the fluid charge into the flow path wherein the fluid circuit means interconnects the flow path downstream of the nozzle of the injection molding machine and proximate a mold sprue communicative with the flow path and wherein the machine nozzle communicates with a bushing in the sprue, and the fluid charge is communicated to an orifice in the sprue bushing.

2. The apparatus of claim 1 wherein the fluid circuit means further includes means for containing the fluid in the article until it has set up in the mold cavity.

3. The apparatus of claim 2 wherein the fluid circuit means further includes means for venting the fluid to ambient.

4. The apparatus of claim 3 wherein said fluid venting means is further adapted to vent the fluid at a controlled rate.

5. The apparatus of claim 1 wherein the fluid charge means includes an accumulator having a first chamber for receiving the fluid charge and is selectively connected to the fluid circuit means.

6. The apparatus of claim 5 wherein the accumulator has a second chamber for receiving a working fluid, and the second chamber is divided from the first chamber by a displaceable member.

7. The apparatus of claim 6 wherein the fluid charge means includes means for regulating pressure in the second chamber in a controlled sequence.

8. The apparatus of claim 1 wherein the orifice is dimensioned to be sufficiently small to substantially resist entry of molten plastic.

9. The apparatus of claim 8 wherein the flow path is divided into first and second branches in the bushing and the orifice is positioned mediate the branches.

10. The apparatus of claim 1 wherein the mold has plural plastic entry points, and the fluid circuit means connects to a selected one or more of the plurality of entry points.

11. The apparatus of claim 10 wherein the fluid charge is communicated to and introduced at said selected one or more of the plurality of entry points.

12. The apparatus of claim 1 wherein the fluid circuit means includes valve means for sequentially communicating the plastic charge to the flow path and venting the fluid from the plastic molded article.

13. For use with a plastic injection apparatus of the type including an injection molding machine with a nozzle for injecting molten plastic, and a mold having a cavity with a sprue opening, an improved device for assisting in the introduction of pressurized fluid comprising:
    a substantially disk-shaped body adapted to seat in the sprue opening, said body having a plastic flow path communicating the machine nozzle with the sprue opening, and a fluid passage extending between an external fluid port and an internal orifice opening to the plastic flow path wherein the orifice is dimensioned to be sufficiently small to resist entry of the molten plastic.

14. The improved device of claim 13 wherein the orifice is positioned to introduce the fluid colinearly with the plastic flow path.

15. The improved device of claim 13 wherein the plastic flow path includes first and second branches and the orifice is positioned mediate said branches.

16. A method for the injection molding of a plastic article in an injection molding system including a resin injection nozzle and a mold having an injection aperture for receiving molten resin from the nozzle at an upstream position, a mold cavity at a downstream position and a resin flow path for fluidly communicating the injection aperture and the mold cavity between the upstream and downstream positions, the method comprising the steps of:
    pressurizing a charge of fluid at a predetermined pressure level;
    injecting a quantity of molten plastic from the injection nozzle through the injection aperture and the flow path and into the mold cavity at a nominal plastic injection pressure;
    communicating the charge of pressurized fluid to an orifice opening to the resin flow path in the mold between the upstream and downstream positions;

introducing the fluid charge into the flow path from the orifice to distribute the molten plastic within the mold cavity;

preventing the introduced fluid charge from traveling from the flow path, through the injection aperture and into the injection nozzle;

containing the fluid under pressure within the article until it has set up in the mold cavity; and venting the fluid to ambient wherein the mold includes valve means movable between fluid open and fluid closed positions, the valve means allowing the fluid charge to travel through the orifice and into the flow path in the fluid open position and preventing the flow of the fluid charge through the orifice and into the flow path in the fluid closed position.

17. The method of claim 16 wherein the fluid is a gas.

18. The method of claim 16 wherein the mold includes a sprue, the sprue having the injection aperture and at least part of the flow path and wherein the charge of pressurized fluid is introduced to the flow path at the sprue.

19. The method of claim 16 wherein the mold includes valve means movable between fluid open and fluid closed positions, the valve means allowing the fluid charge to travel through the orifice and into the flow path in the fluid open position and preventing the flow of the fluid charge through the orifice and into the flow path in the fluid closed position.

20. The method of claim 16 wherein the valve means accomplishes the step of preventing the fluid charge from traveling towards the upstream position from the flow path in the fluid open position.

21. The method of claim 15 or 20 wherein the valve means is movable linearly relative to the rest of the mold and wherein said step of introducing includes the step of linearly moving said valve means.

22. The method of claim 20 wherein the valve means is movable in rotary fashion relative to the rest of the mold and wherein said step of introducing includes the step of rotating said valve means.

23. The method of claim 16 wherein the pressure of the fluid charge is controlled initially at the predetermined level and thereafter reduced after introduction of the fluid charge into the mold cavity.

24. The method of claim 23 wherein the pressure of the fluid charge is reduced in a substantial step function.

25. The method of claim 23 wherein the pressure reduction of the fluid charge is effected upon penetration of the fluid into the resin within the mold cavity.

26. The method of claim 16 wherein the fluid is vented from the article by metering the fluid.

27. The method of claim 16 wherein the step of venting includes the step of separating the mold and the injection nozzle after the molten resin has cooled beneath its softening point.

28. The method of claims 16 or 27 wherein the fluid is vented from the article through the same orifice as which it was introduced.

29. The method of claims 16 or 27 wherein the fluid is vented from the article through a different orifice as which it was introduced.

30. The method of claim 16 wherein the charge of pressurized fluid is introduced into the flow path at plural flow path points.

31. An injection molding system for the injection molding of plastic articles comprising:

an injection molding machine including an injection nozzle for injecting molten plastic through the nozzle;

a mold having a resin injection aperture for receiving the molten plastic at an upstream position, a cavity defining the shape of the molded article at a downstream position and a plastic flow path for fluidly communicating the injection aperture and the cavity between the upstream and downstream positions;

fluid charge means for pressurizing a charge of fluid at a predetermined level; and fluid circuit means interconnecting the flow path and the fluid charge means between the upstream and downstream positions at an orifice opening to the flow path for introducing the fluid charge into the flow path so that the fluid charge distributes the molten plastic in the mold cavity; said fluid means including means for preventing the introduced fluid charge from traveling from the flow path, through the injection aperture and into the nozzle wherein the mold includes a sprue, the sprue having the injection aperture and at least part of the flow path and wherein the fluid circuit means is contained within the sprue and wherein the sprue includes a bushing having the orifice and wherein the injection nozzle communicates with the bushing and the fluid charge is communicated to the orifice in the bushing.

32. The system of claim 31 wherein the fluid circuit means further includes means for containing the fluid in the article until it has set up in the mold cavity 33. The system of claim 32 wherein the fluid circuit means further includes fluid venting means for venting the fluid to ambient.

34. The system of claim 33 wherein said fluid venting means is further adapted to vent the fluid at a controlled rate.

35. The system of claim 31 wherein the fluid charge means includes an accumulator having a first chamber for receiving the fluid charge and is selectively connected to the fluid circuit means.

36. The system of claim 35 wherein the accumulator has a second chamber for receiving a working fluid, and wherein the second chamber is divided from the first chamber by a displaceable member.

37. The system of claim 36 wherein the fluid charge means includes means for regulating the pressure in the second chamber in a controlled sequence.

38. The apparatus of claim 31 wherein the orifice is dimensioned to be sufficiently small to substantially resist entry of molten plastic.

39. The system of claim 31 wherein the flow path is divided into first and second branches in the bushing and the orifice is positioned mediate the branches.

40. The system of claim 31 wherein the mold has plural plastic entry points located between the upstream and the downstream positions, and the fluid circuit means connects to a selected one or more of the plurality of entry points.

41. The system of claim 40 wherein the fluid charge is communicated to and introduced at said selected one or more of the plurality of entry points.

42. The system of claim 31 wherein the fluid circuit means includes valve means having open and closed positions, said valve means introducing the fluid charge to the flow path through the orifice in the open position and preventing communication of the fluid charge to the flow path in the closed position.

43. For use with an injection molding system of the type including an injection nozzle and a mold having a mold cavity at a downstream position, a resin injection aperture at an upstream position and a resin flow path for fluidly communicating the injection aperture and the mold cavity, a device for assisting in the introduction of pressurized fluid into the cavity and for preventing the fluid from traveling from the flow path, through the injection aperture and into the nozzle, the device comprising:

a body adapted to seat in the mold between the upstream and downstream positions, said body defining at least part of the resin flow path communicating the injection aperture with the cavity, the body having an orifice opening to the flow path, an external fluid port and a fluid passage extending between the external fluid port and the orifice wherein the orifice is dimensioned to be sufficiently small to resist entry of the molten resin.

44. The device of claim 43 wherein the orifice is positioned to introduce the fluid colinearly with resin flow from the upstream position to the downstream position.

45. The device of claim 43 wherein the resin flow path includes at least one branch and the orifice is positioned adjacent the at least one branch.

46. The device of claim 43 wherein the mold includes a sprue having a sprue opening and wherein the device is adapted to seat in the sprue opening.

47. The device of claim 4 or claim 46 further comprising valve means for controlling the flow of fluid through the body.

48. The device of claim 47 wherein the valve means is located in the body.

49. The device of claim 47 wherein the body includes first and second body parts movable relative to one another between at least first and second control positions to define said valve means.

50. The device of claim 49 wherein each of the first and second body parts at least partially defines the resin flow path in the first control position and prevents the flow of fluid into the resin flow path in the first control position.

51. The device of claim 49 wherein the first and second body parts are rotatable relative to each other.

52. The device of claim 49 wherein the and second body parts are movable linearly to each other.

53. The device of claim 49 wherein the body has a venting orifice for venting the fluid from the article, said first and second body parts allowing the venting of the fluid through the venting, orifice in a third control position.

54. The device of claim 50 wherein in the second control position, the first and second body parts prevent the flow of plastic through the body and allow the flow of fluid through the body.

55. The device of claim 48 wherein the valve means includes a needle valve.

* * * * *